United States Patent [19]
Neise et al.

[11] Patent Number: 5,518,364
[45] Date of Patent: May 21, 1996

[54] METHOD FOR THE REDUCTION OF SOUND EMISSION AS WELL AS FOR THE IMPROVEMENT OF THE AIR OUTPUT AND THE EFFICIENCY IN AN AXIAL FLOW MACHINE, AND FLOW MACHINE

[75] Inventors: Wolfgang Neise; Frank Kameier, both of Berlin, Germany

[73] Assignee: Deutsche Forschungsanstalt for Luft-und Raumfahrt E.V., Bonn, Germany

[21] Appl. No.: 218,271

[22] Filed: Mar. 25, 1994

[30] Foreign Application Priority Data

Mar. 27, 1993 [DE] Germany ............... 43 10 104.6

[51] Int. Cl.$^6$ ............................................ F01D 25/04
[52] U.S. Cl. ............................................. 415/119; 415/220
[58] Field of Search ........................ 415/119, 173.1, 415/173.3, 173.5, 220, 208.5

[56] References Cited

U.S. PATENT DOCUMENTS

| | | | |
|---|---|---|---|
| 885,032 | 4/1908 | de Ferranti | 415/173.3 |
| 3,321,931 | 5/1967 | Lehmkuhl | 415/119 |
| 3,832,085 | 8/1974 | DeFauw et al. | 415/119 |
| 4,273,510 | 6/1981 | Ambrosch et al. | 415/119 |

FOREIGN PATENT DOCUMENTS

| | | |
|---|---|---|
| 1600841 | 9/1970 | France ............... 415/119 |
| 2588925 | 10/1985 | France . |
| 1503636 | 3/1969 | Germany . |
| 7535700 | 11/1975 | Germany . |
| 992266 | 4/1962 | United Kingdom . |
| 1412680 | 9/1973 | United Kingdom . |
| 1483590 | 12/1973 | United Kingdom . |
| 1521453 | 10/1976 | United Kingdom . |

OTHER PUBLICATIONS

"Compressor Aerodynamics" by N. A. Cumpsty, *Longman Scientific & Technical*, 1989, pp. 401–408.

Primary Examiner—Thomas E. Denion
Assistant Examiner—Mark Sgantzos
Attorney, Agent, or Firm—Hopkins & Thomas

[57] ABSTRACT

An axial flow machine (1) having a rotor (2) that rotates about a fixed axis (5) the rotor having a number of blades (4), and a casing (3), radially surrounding the rotor (2). A turbulence generator (14) is positioned in a ring-shaped gap (9) formed between the tips (7) of the blades (4) and the inner surface (8) of the casing (3) to limit the sound emission of the flow machine (1).

11 Claims, 6 Drawing Sheets

METHOD FOR THE REDUCTION OF SOUND EMISSION AS WELL AS FOR THE IMPROVEMENT OF THE AIR OUTPUT AND THE EFFICIENCY IN AN AXIAL FLOW MACHINE, AND FLOW MACHINE

FIELD OF THE INVENTION

The invention relates to a method and an axial flow or machine for the reduction of sound emission and for the improvement of the efficiency in an axial flow machine.

BACKGROUND OF THE INVENTION

Embodiments of axial flow machines include, for example, jet airplane engines, axial turbines, axial pumps, axial compressors, and axial fans. In the following, the invention and the underlying problem will be explained with reference to axial fans. The invention may be used with any kind of flow machines, though, and is not limited to a specific fluid either. Axial fans are used in different technical fields and serve to transport gases or gaseous suspensions through the housing surrounding the rotor, which may be a part of a system of tubing. High pressure axial fans with very large drive powers of up to 20 MW are used in flue gas desulferizing devices of large power plants, garbage incinerating plants, and wind tunnels. Axial fans of common air conditioning systems have drive powers in the order of 50 kW. Axial fans of different motor cooling systems have power ratings below this. In the lowest power rating class are for example axial cooling fans used in computers.

From aero- and hydrodynamics it is well known to force a laminar-to-turbulent boundary transition to occur at surfaces in a flow by using turbulence generators. The acceleration for forcing of the laminar-to-turbulent boundary transition is also used in aeronautics. A turbulent boundary layer may have a higher drag, but there is also a smaller tendency for stall. For instance, so-called trip wires or sandpaper are often used on gliders to create turbulent boundary layers at the wings.

A method for the improvement of the efficiency of an axial flow machine is known from the German Offenlegungsschrift 15 03 636. Here, the inner surface of the casing surrounding the rotor is roughened in order to reduce the induced resistance at the blades of axial fans. This treatment is supposed to cause the formation of a boundary layer at the inner surface in the region of the rotor or amplify an already existing boundary layer. The boundary layer serves to close the gap between the tips of the blades of the rotor and the casing. It is not the object to close the gap, though, on the contrary it is suggested to make the gap larger than normal. The roughness of the inner surface of the casing, which acts as a turbulence generator, can be effected by the application of a material that enlarges the roughness of the inner surface. Alternatively, it is possible to groove the casing along the perimeter region of the rotor and to fill this groove with a rough material. The width of the region of the casing provided with a roughness should correspond to the axial length of the blades of the rotor at their tips.

A method for the reduction of sound emission using a turbulence generator and a flow machine with a turbulence generator are also known from the French Patent 85 15 737. In this case a so-called trip wire as a turbulence generator is arranged directly on the blades of the rotor. This reduces the tendency for laminar stall of the rotating blades. This in turn reduces the sound emission and increases the usable region of the aerodynamic characteristic of the flow machine. On the other hand, the flow resistance is increased and therefore the efficiency of the flow machine is reduced.

From the German Utility Model 75 35 700 a wind guide for a fan propeller is known, which has a rotor and a casing surrounding the rotor, the casing being formed as the wind guide. In order to reduce the sound emission of the fan propeller in the presence of a relatively large gap, the inside of the casing is clad with a porous, sound absorbing material, or the whole casing is made of a porous, sound absorbing material. In the region of the tips of the rotor the sound absorbing material may be covered with a thin, non-porous protective layer, in order to prevent dirt from entering the underlying porous material. The porous, sound absorbing material is effective by taking up whirls emanating from the tips of the blades of the rotor and transforming their kinetic energy into thermal energy.

In the different flow machines different widths of the gap between the tips of the blades of the rotor and the inner surface of the casing are usual. The width of the gap negatively influences the efficiency of the flow machine as well as the technically usable region of the aerodynamic characteristic, and is therefore chosen to be as small as possible without allowing the tips of the blades to touch the inner surface of the casing. The minimum attainable values depend on the manufacturing tolerance of the axial fan and the casing, on the stiffness of the fan-casing-arrangement, as well as on the smooth running of the rotor of the axial fan. Furthermore, thermal effects must be taken into consideration, i.e. different thermal expansion rates during the operation of the fan. Gaps with especially large widths cannot be avoided in axial fans with adjustable blades for different stagger angles, since the cylindrical gap geometry is usually changed with a different setting of the blades.

High pressure axial fans of flue gas desulferizing plants, for example, have very small gap widths of 0.1% of the rotor diameter, corresponding to absolute values of 2.5 to 3.5 mm with rotor diameters typically in the range of 2.5 to 3.5 meters. This necessitates an elaborate manufacturing process, which is economical due to an increase of efficiency, though, and therefore usual. Compared to this, higher quality motor cooling fans have which are usually not less than 0.5% of the rotor diameter. Axial fans used in computers have significantly higher relative gap widths, still. This cannot be avoided in the high volume, cost effective production, since smaller widths of the gap would already present the danger of the tips of the blades coming into contact with the inner surface of the casing.

Apart from the loss of efficiency with large gap widths, significant sound emission is registered. Especially in certain frequency ranges below the blade frequency a so-called "blade-tip-whirl-noise" occurrs, which dramatically increases with the width of the gap between the tips of the blades and the inner surface of the casing. The technically usable region of the aerodynamic characteristic of an axial flow machine, i.e. the smallest still usable volume flow, is determined by the gap in the sense that the flow machine can operate at slower speeds, without instationary transport occurring.

From the book "Compressor aerodynamics" (N. A. Cumpsty, New York, 1989) it is known to extend the technically usable region of the aerodynamic characteristic through a modification of the casing surrounding the axial fan, the so-called "casing treatment". This entails bringing slits ending in the casing into the inner surface of the casing. These slits are preferably oriented axially and may be slanted with respect to,the inner surface of the casing. With this casing treatment an enlargement of the usable region of the characteristic may be obtained, but this is connected to a decrease of efficiency. Furthermore, it is disadvantageous that the casing treatment is considerably elaborate, especially when being applied to already existing machines. There is also the danger of particles clogging the slits of a flow machine with casing treatment when transporting gaseous suspensions.

SUMMARY OF THE INVENTION

It is the object of the invention to provide an axial flow machine and a method which reduces the sound emission of existing axial flow machines while at the same time improving the efficiency and extending the technically usable region of the aerodynamic characteristic. Furthermore, an axial flow machine is provided, which has a limited sound emission and at the same time a high efficiency and a large usable region of the characteristic. As was proven experimentally, the turbulence generator introduced into the gap significantly reduces blade-tip-whirl-noise as well, improves the efficiency and extends the technically usable region of the aerodynamic characteristic of the flow machine. The action of the turbulence generator is traced back to the following interrelations. A backflow from the pressure side to the suction side of the flow machine occurrs in the gap between the tips of the blades and the inner surface of the casing. This backflow, at a corresponding velocity, leads to an elimination of the axial flow to the rotating blades in the region of their tips. From the remaining azimuthal flow of the rotating blades, whirls detach from the suction side of the profile of the blades in the region of their tips, which rotate in an azimuthal direction. The interaction of detached whirls of different blades leads to the creation of the blade-tip-whirl-noise. The turbulence generator in the gap hinders the backflow from the pressure side to the suction side of the flow machine. The reason for this is the flow resistance (drag) of the turbulence generator. The hinderance of the backflow improves the efficiency of the flow machine and at the same time causes flow to the tips of the blades also in the axial direction. This already is equivalent to a favorable state of flow to the blades and a suppression of whirl formation. Furthermore, the disturbances caused by the turbulence generator effect the stall at the profile of the blades positively in the sense that the flow detaches only at higher pressure differences and smaller supply rates. The improvements with respect to the sound emission, the efficiency, and the shift of the rotating flow detachment to smaller supply rates are attained with surprisingly little effort. Turbulence generators are neither expensive, nor is their installation in the gap between the tips of the blades and the casing elaborate. Associated with the partial closing of the gap by the turbulence generator is a positive effect with respect to the sound emission as well as to the efficiency. A full bridging of the gap using the turbulence generator can also be realized in spite of the omnipresent tolerances, since an elastic or yielding turbulence generator is chosen in accordance with the invention, which does not lead to problems during a contact with the tips of the rotating blades.

Naturally, an axial flow machine may be equipped with an elastic or yielding turbulence generator in the gap between tips of the blades and the inner surface of the casing from the beginning.

A wire cloth or textile cloth is especially well suited to function as the turbulence generator in an embodiment of the invention.

The turbulence generator is most effective with respect to the sound emission, when it is arranged in the region of the greatest thickness of the profile of the blades of the rotor. The region behind the greatest thickness of the profile of the blades is the origin of the blade-tip-whirl-noise, and it is there that the development of the blade-tip-whirl-noise is most effectively prevented.

With the gap between the tips of the blades of the rotor and the inner surface of the casing being modified in accordance with the invention, the reduction Of the specific sound pressure level can be more than 10 dB(A), depending on the initial configuration of the gap, in conjunction with an improvement of a rise in pressure by more than 10% and a percentage increase in its efficiency. Even with high pressure axial fans there are percentage increases in the expected improvements of the fan, which can lead to significant power savings, considering input powers in the Megawatt range, as well as a reduction of the sound emission.

The invention is further explained and described with the aid of a preferred embodiment. The drawings show.

BRIEF DESCRIPTION OF THE DRAWINGS

DETAILED DESCRIPTION

Figure 1:
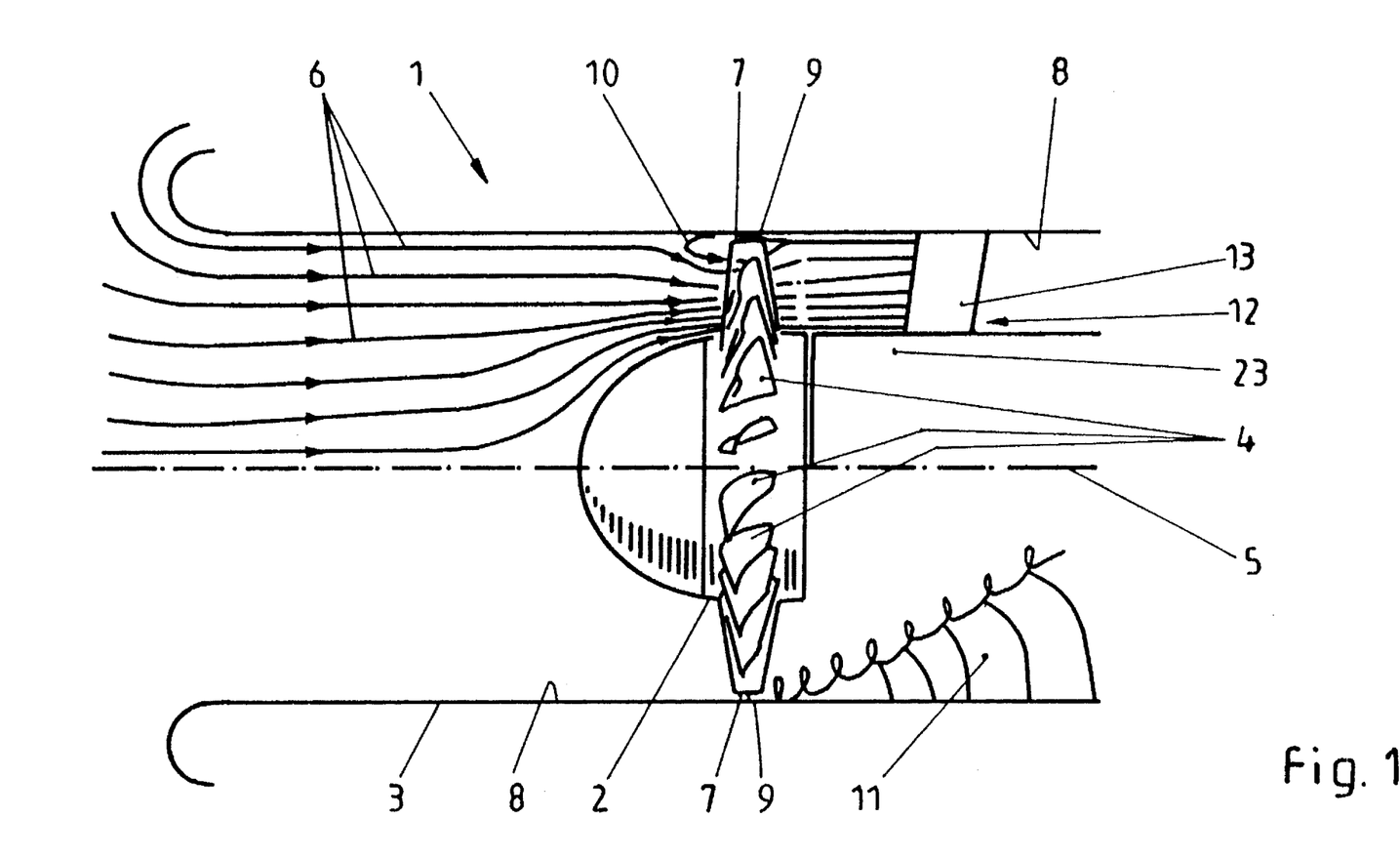
FIG. 1 is a cross section of a flow machine.

FIG. 1 shows an axial flow machine 1 with a rotor 2 and a casing 3 surrounding the rotor. The rotor 2 has a number of blades 4 and rotates about a fixed axis 5. The rotor 2 is driven by an electric motor integrated into the hub 23 and not detailed here. The rotating rotor 2 causes a gas flow, which is shown by the flow lines 6, in the casing 3. The flow lines 6 run mostly parallel to the axis 5 of the rotor 2. This is different in the region of the tips 7 of the blades 4. The tips 7 have a distance with respect to the inner surface 8 of the casing 3, so that there is a ring shaped gap 9 between the rotor 2 and the inner surface 8. The gap 9 has two effects on the gas flow in the casing 3, which are shown separately in the upper and lower half of FIG. 1. The first is a backflow 10 directed opposite to the main flow direction forming in the gap. The backflow 10 reduces the efficiency of the flow machine 1. The second is the formation of whirls in the region of the tips 7 of the blades 4, which become apparent by sound emission 11 as the so-called "blade-tip-whirl-noise". Both effects are unwanted and are decreased by the present invention.

Figure 2:
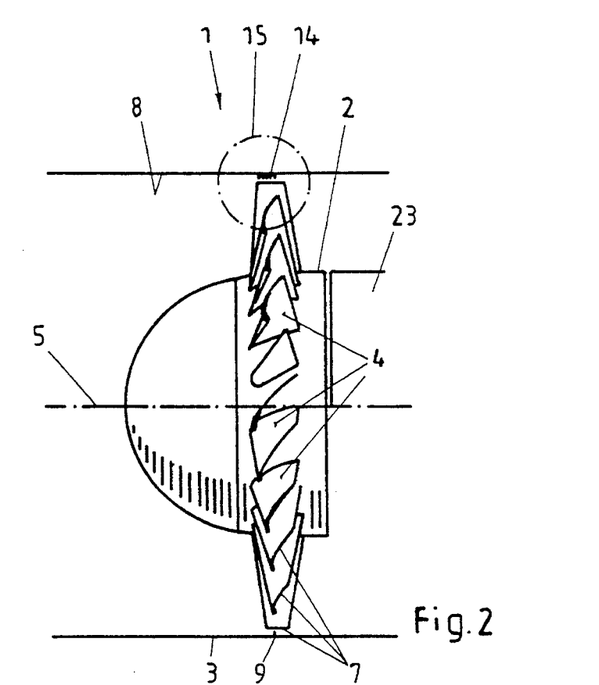
FIG. 2 is a detailed side elevation of the rotor of the flow machine according to FIG. 1.

FIG. 2 shows the rotor 2 and the casing 3 surrounding the rotor as in FIG. 1, modified according to the invention. The flow lines 6 are not shown here in the interest of clarity. A turbulence generator 14 is positioned in the gap 9 formed the tips 7 of the blades 4 and the inner surface 8 of the casing 3. The turbulence generator 14 reduces the backflow 10 illustrated in FIG. 1 and therefore leads to an increase in the efficiency of the flow machine 1. The turbulence generator 14 further changes the gas flow in the region of the tips 7, so that the sound emission 11 of the flow machine 1 is reduced and the technically usable region of its aerodynamic characteristic is extended.

Figure 3:
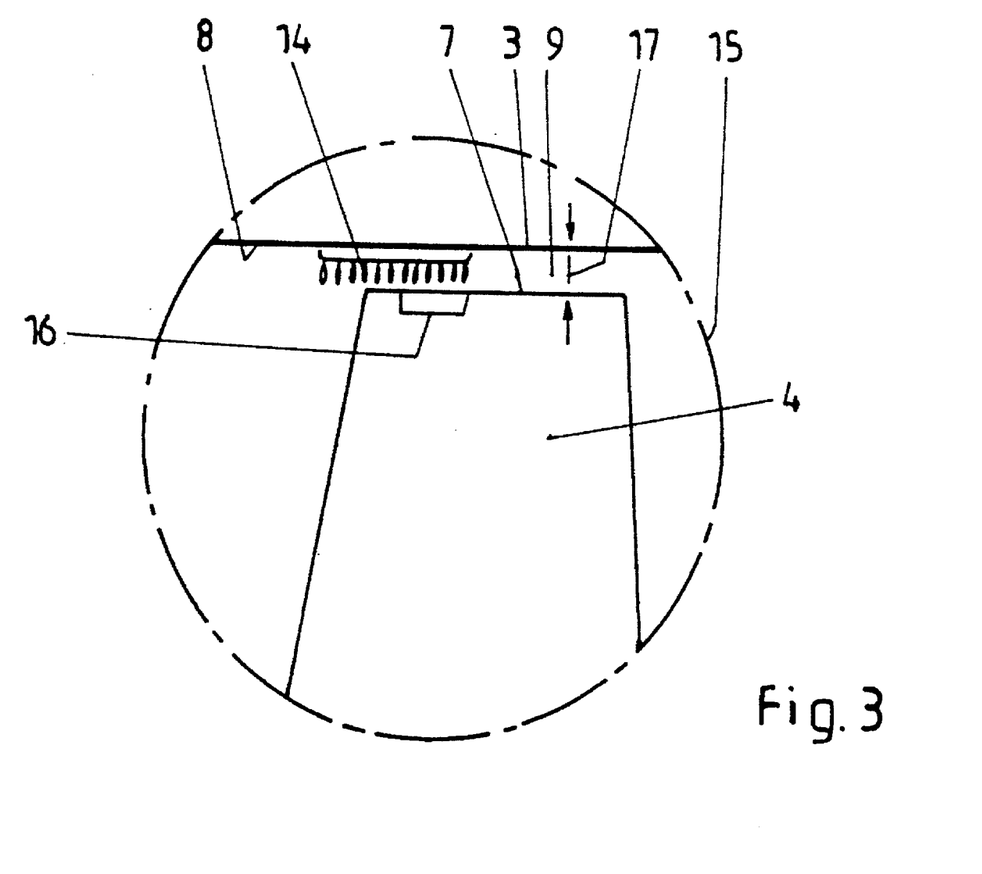
FIG. 3 is an enlarged detail of FIG. 2.

The exact arrangement of the turbulence generator is shown enlarged in FIG. 3, where the content of FIG. 3 corresponds to a circle 15 in FIG. 2. The turbulence generator 14 is positioned or mounted primarily in the region 16 of the largest thickness in profile of the blades 4 at the inner surface 8 of the casing 3. This is best shown in FIGS. 1 and 2, where the region 16 of the greatest, or largest, thickness in the profile of blades 4 refers to the maximum distance of rotor 2's width extending from a first rotor blade tip 7 to a second rotor blade tip 7 mounted on rotor 2 diametrically opposite the first rotor blade, the rotor blades describing a concentric circle of the rotor blade tips 7 about axis 5 that extend the closet to inner-surface 8 of casing 3. The turbulence generator 14 partially fills the gap 9. This holds for the separation 17 of the gap between blade tip 7 and inner-surface 8, as well as its length. Apart from this the region filled by the turbulence generator 14 is not closed in a gas tight way. It is rather that the flow resistance for the backflow 10 according to FIG. 1 is increased in the gap 9. The position of turbulence generator 14 allows the application of the invention also in flow machines with blades adjustable for different angularly staggered settings. Here the turbulence generator should preferably be arranged where the outer radius of the rotor 2 remains constant for different settings of the blades 4.

Figure 4:
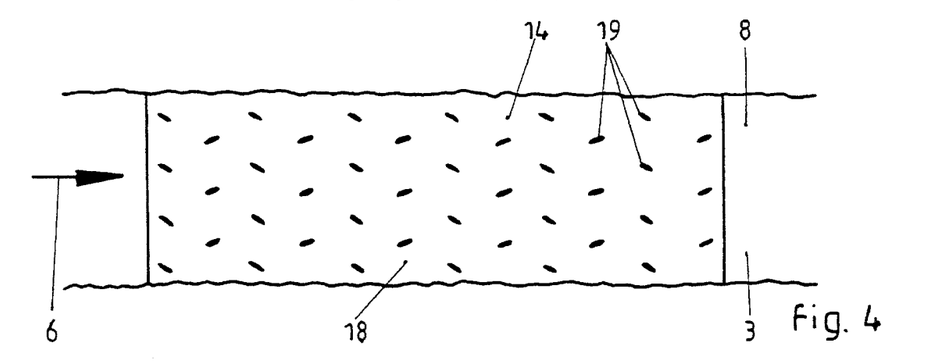
FIG. 4 is a top view of a turbulence generator used in the flow machine of FIG. 1.
Figure 5:
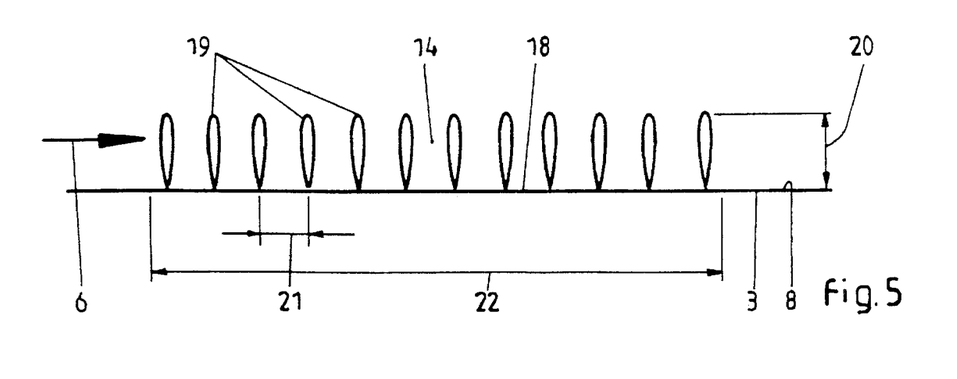
FIG. 5 is a cross section of the turbulence generator of FIG. 4.

FIG. 4 shows a top view of the turbulence generator 14 installed at the inner surface 8 of the casing 3. The flow line 6 points in the main flow direction in the casing 3. FIG. 5 shows a corresponding side view of the turbulence generator 14. The turbulence generator 14 consists of an adhesive tape substrate 18 and a multitude of loops 19 connected to the substrate 18. The loops 19 are formed as strings made from synthetic material and have a height 20 of 2 mm. The distance 21 between the loops 19 is approximately 1.3 mm and the width 22 of the turbulence generator in the axial direction is 15 mm. The turbulence generator 14 corresponds to the loop strip of a common hook-and-loop fastener. The invention is not limited to this particular turbulence generator, though. A polyolefin strip with a multitude of short-stemmed half-spheres may for instance also be used. In the experiments described hereinafter the strip of polyamide loops shown enlarged in the FIGS. 4 and 5 was used as the turbulence generator 14. It is anticipated that a wire cloth or textile cloth may also be used as turbulence generator 14.

The experimental setup corresponding to the FIGS. 1 to 5 has the following parameters. The span of the rotor is 452.4 mm, its hub ratio is 0.62. 24 blades 4 with a profile of the NACA 65 series are provided. The chord length of the blades at their tips 7 is 43 mm, the maximum thickness of the blades is 3 mm. The staggering angle of the blades is 27° measured at their tips. A stator 12 with unprofiled blades 13 is arranged downstream from the rotor 2. The rotor is driven directly by a d.c. motor intergrated in the hub 23 of the rotor 2. The separation 17 of the gap to be modified was 2.4 mm. For comparison purposes it was reduced to 1.6, 0.6, and 0.3 mm. The concentricity of the casing 3 and the rotor 2 was 0.01 mm. Further, the setup corresponded to DIN (German Industrial standard) 24163 for the measurement of the aerodynamic power output, and to DIN 45635, part 9 for the determination of the sound emission in the channel of the casing 3 downstream from the flow machine 1.

The experimental results shown in the FIGS. 6 to 11 are plotted in dimensionless units. These dimensionless units result from the following normalization:

From the density ρ of the gas (air) transported by the flow machine 1 and the square of the circumferential velocity of the rotor 2, there results from the pressure rise Δp the pressure number Ψ:

$$\Psi = \frac{\Delta p}{\frac{\rho}{2} \cdot U^2}$$

For the consideration of the geometric change of the cross section during the variation of the separation 17 of the gap 9 the volume flow $\dot{V}$ is made into a dimensionless volume flow D with the inner diameter $A_G$ of the casing 3 and the circumferential velocity U of the rotor 2. The dimensionless volume flow ϕ corresponds to:

$$\Phi = \frac{\dot{V}}{U \cdot A_G}$$

The mechanical power taken up by the flow machine 1 is calculated from the electrical power $P_{e1}$ supplied to the motor and the electrical efficiency $\eta e_1$ of the motor. The efficiency η of the flow machine is defined as the ratio of the aerodynamic power $\dot{V}$ Δp provided by the flow machine to the mechanical power $\eta_{e1}$ $P_{e1}$ supplied to it:

$$\eta = \frac{\dot{V} \cdot p}{\eta_{e1} \cdot P_{e1}}$$

The specific sound pressure level $Lw_s$ is:

$$Lw_s = Lw - 20 \log \frac{\Delta p}{\Delta p_0} - 10 \log \frac{\dot{V}}{\dot{V}_0}$$

The specific sound pressure level $Lw_s$ allows an acoustic comparison of flow machines with different aerodynamic powers, without discriminating against more powerful flow machines having a higher sound pressure level. Accordingly, from this the sound power is determined from the mean azimuthal sound pressure level Lp, taking into account the measuring channel cross section:

$$Lw = Lp - 10 \log \frac{A}{A_0}$$

Figure 6:
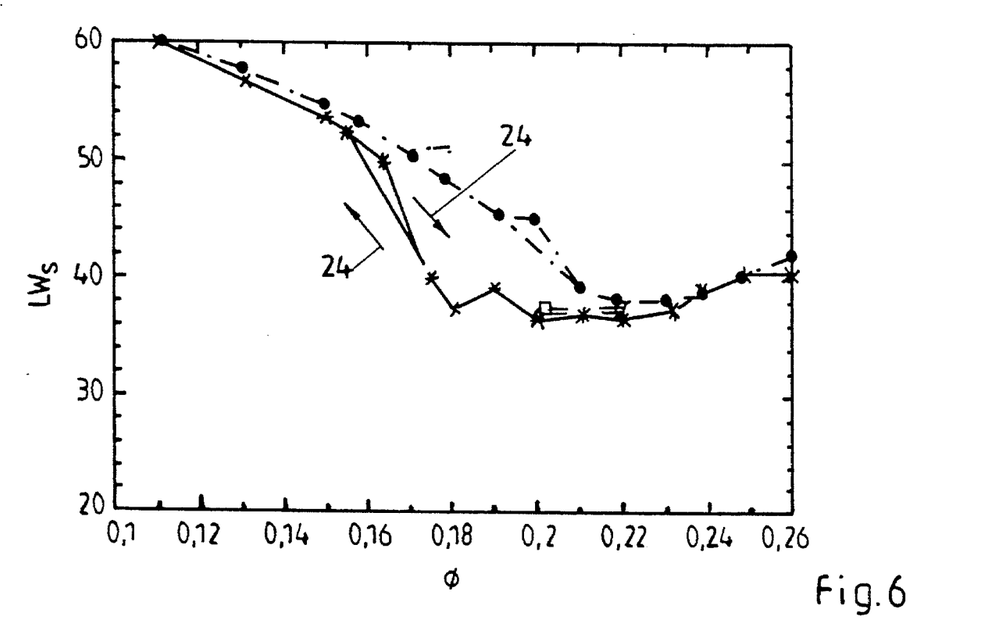
FIG. 6 is the course of the specific sound pressure level of the flow machine of FIG. 1.
Figure 7:
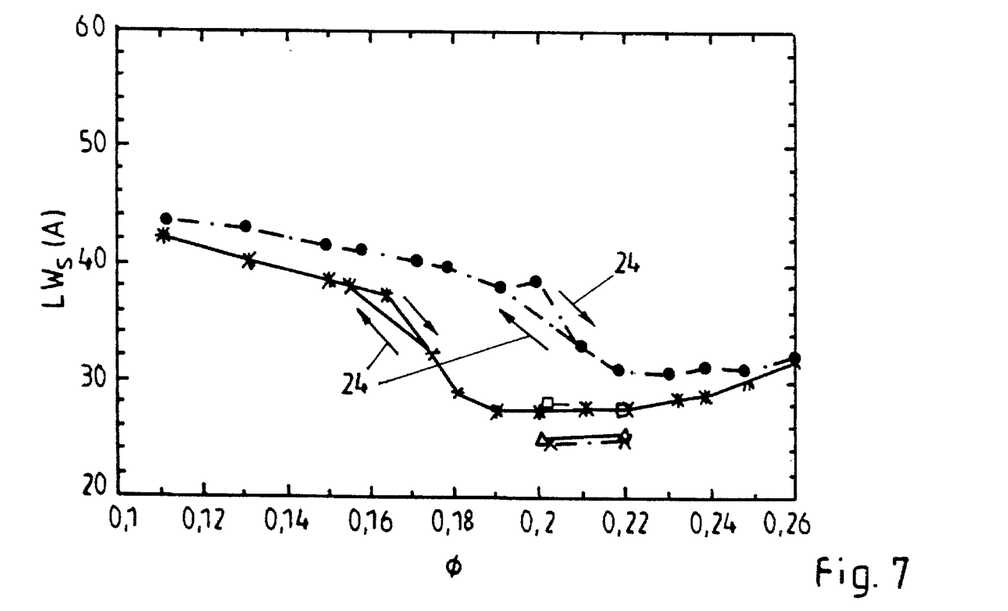
FIG. 7 is the course of the A-weighted specific sound pressure level of the flow machine of FIG. 1.

In the FIGS. 6 and 7 as well as 10 and 11 the measured values for different gap configurations are shown. The stars * connected by the solid line correspond to a gap of 2.4 mm, i.e. 0.53% relative gap-width with respect to the diameter of the rotor 2, modified by the turbulence generator 14 in accordance with the invention. The solid circles ● connected by the dashed line represent the values measured in an unmodified gap 9 of the same width. The empty squares □, the empty triangles Δ, and the crosses x correspond to gap separations 17 of 1.2, 0.6, and 0.3 mm, respectively being 0.27, 0.13, and 0.065 percent of the diameter of the rotor 2. Arrows 24 in FIGS. 6 and 7, as well as 10 and 11, show the direction of the corresponding hysteresis.

FIG. 6 shows for the different gap configurations the course of the specific sound pressure level $Lw_n$ as a function of the supply number $\Phi$ at a rotational frequency of 1400 rpm. For the reduced gap widths of 1.2, 0.6, and 0.3 mm only the optimum values of the flow machine 1 with the modified gap 9 of $\Phi=0.200$ and with an unmodified gap 9 of $\Phi=0.220$ are shown. The flow machine 1 has a significantly lower specific sound emission with a modified gap 9 over the major range of the supply number $\Phi$ than with an unmodified gap 9. The reduction of the sound emission even is larger than attainable by a halfing of the gap from 2.4 to 1.2 mm.

This is also evident from the course of the A-weighted specific sound pressure level shown in FIG. 7, which emphasizes the differences of the sound emission of the gap configurations even more.

Figure 8:
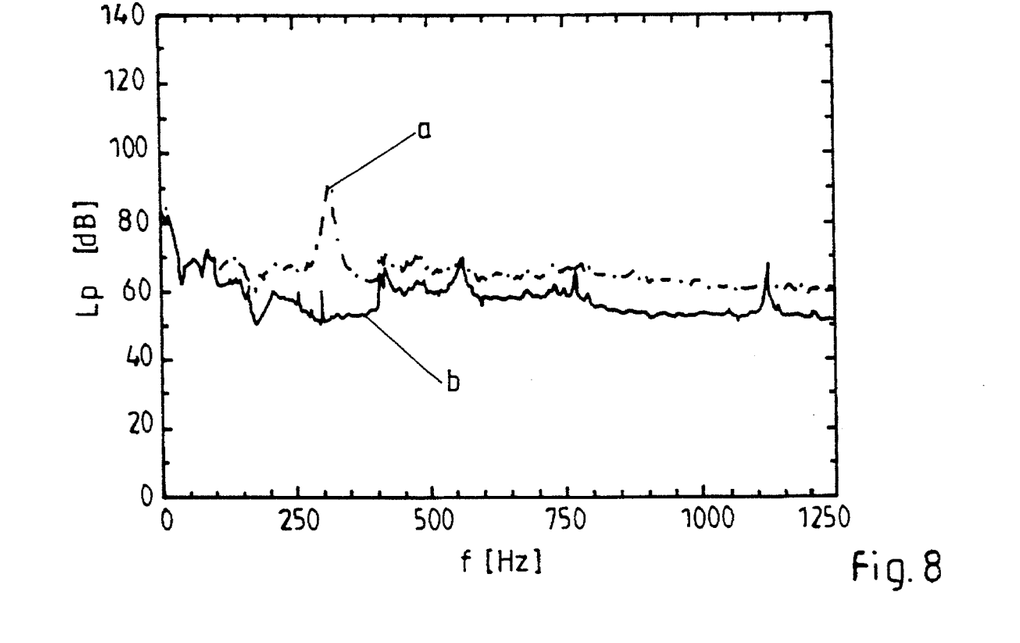
FIG. 8 is a spectrum of sound pressure variations of the flow machine of FIG. 1.

FIG. 8 shows the spectrum of the sound pressure variations in the channel downstream from the flow machine 1 for the unmodified gap "a" and the modified gap "b" at the same separation 17 of 2.4 mm, in each case for the operating point with the highest level of the sound component of the blade-tip-whirl-noise at n= 1400 rpm. The operating point with the highest level of the sound component of the blade-tip-whirl-noise was at $\Phi= 0.200$ and $\Psi= 0.360$ for the unmodified gap. With the modified gap the pressure number $\Psi= 0.410$ is significantly larger at the same supply number $\Psi= 0.200$, yet there is no blade-tip-whirl-noise. The level of the sound pressure is lower for almost all frequencies of the technically usable region before the onset of stall with the modified gap "b" as compared to the unmodified gap "a". The noise is included in the reduction of the sound emission, so that the blade frequency and its harmonics are emphasized with the modified gap "b".

Figure 9:
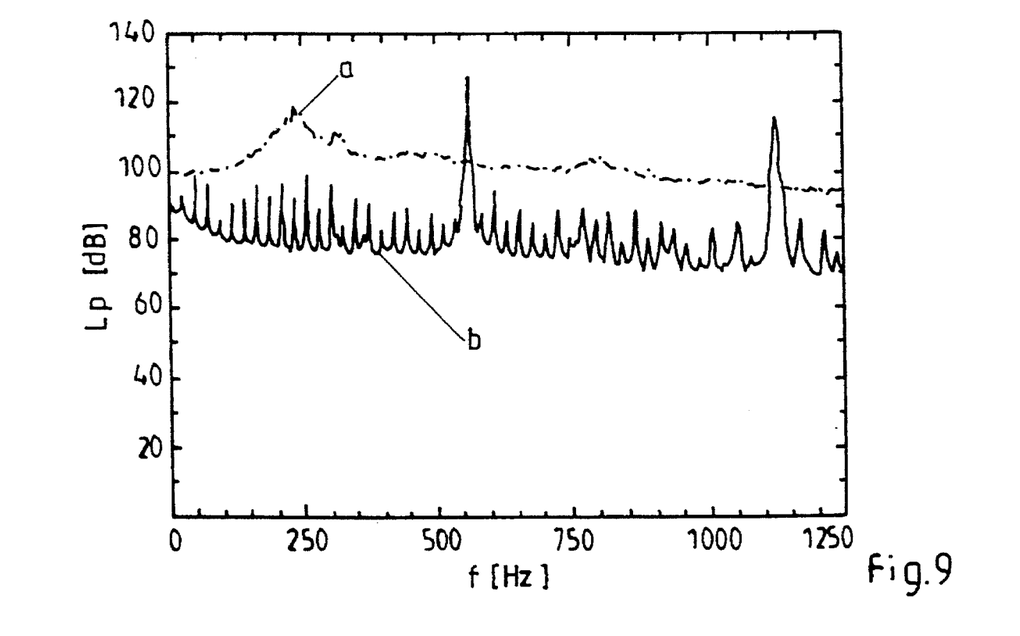
FIG. 9 is a spectrum of wall pressure variations in the flow machine of FIG. 1.
Figure 10:
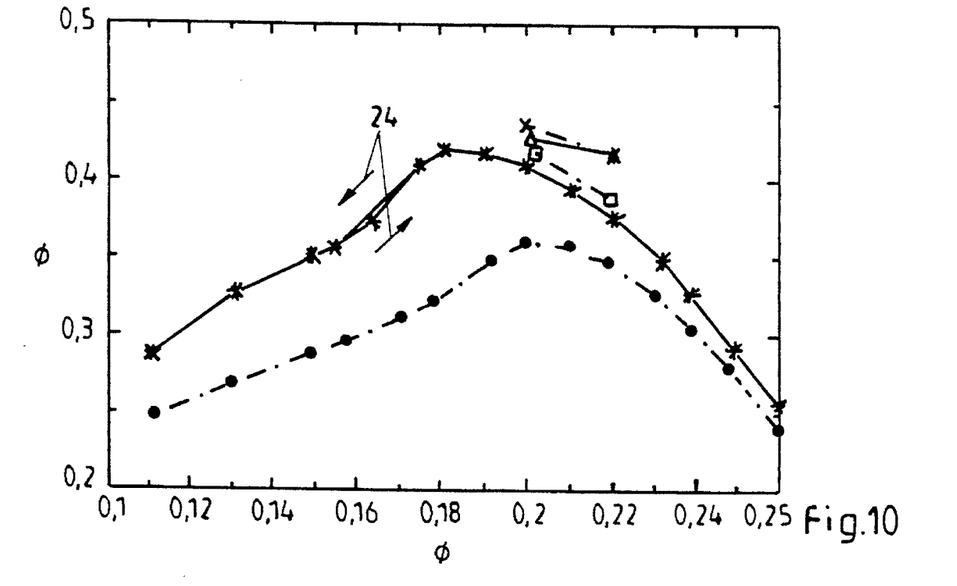
FIG. 10 is the characteristic of the pressure rise in the flow machine of FIG. 1.

This effect is even stronger with the wall pressure variations at the inner surface 8 of the casing 3 in the region of the front edge 16 of the blades 4 of the rotor 2, which are shown in FIG. 9 for the unmodified gap "a" and the modified gap "b", again at the operating point with the highest level of the sound component of the blade-tip-whirl-noise at n= 1400 rpm. The spectrum of the wall pressure variations is dominated by the blade frequency and its harmonics for the modified gap "b", while the noise of the blade-tip-whirl-noise is greatly reduced.

The characteristics of the pressure number $\Psi$ shown in FIG. 5 prove that the flow machine 1 with the modified gap 9 produces higher pressures at the same separation 17 of the gap 9 than with an unmodified gap. The pressure rise with the modified gap corresponds almost to the pressure rise attainable with the separation 17 of the gap 9 reduced to one half (open squares).

Figure 11:
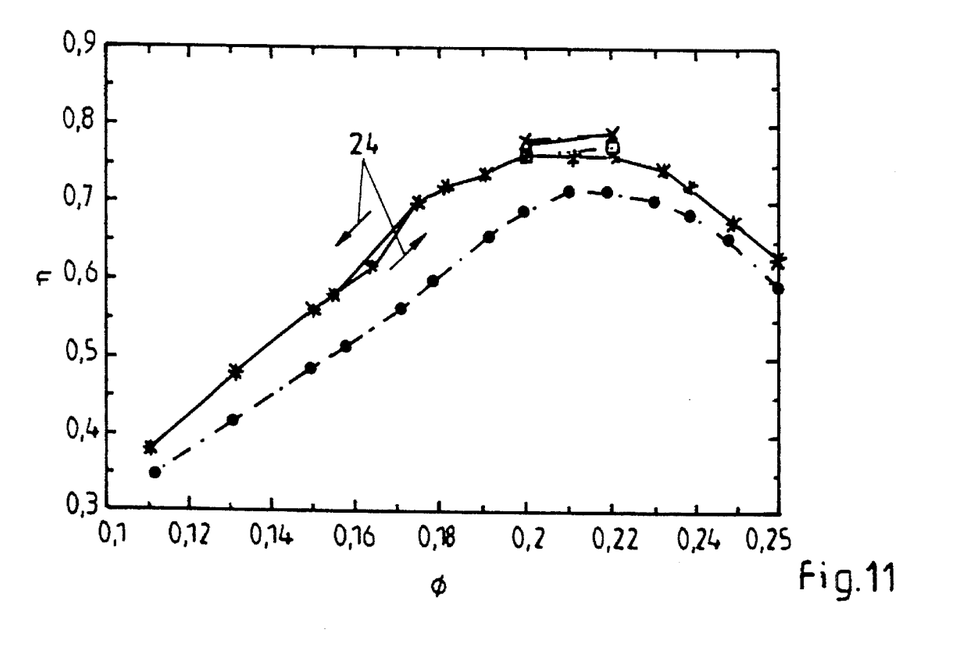
FIG. 11 is the course of the efficiency of the flow machine of FIG. 1.

The efficiency η behaves similarly, as shown in FIG. 11. The efficiency of the flow machine with the modified gap (stars) is higher over the full range of the supply number $\Phi$ than for the flow machine with an unmodified gap.

In summary, it can be deduced from all the experimental values that the modification of the gap 9 with the strip of loops used in the experiments corresponds to the halving of the separation 17 of the gap 9. This cannot be explained by the reduction of the cross section of the gap 9 due to the turbulence generator 14 alone. It is rather that the flow characteristics of the turbulence generator 14 are important.

While the foregoing specification and drawings disclose a preferred embodiment of the invention, it will be understood by those skilled in the art that variations and modifications thereof can be made without departing from the spirit and scope of the invention, as set forth in the following claims.

LIST OF REFERENCE NUMERALS:

1—flow machine
2—rotor
3—casing
4—blade
5—axis
6—flow line
7—tip
8—inner surface
9—gap
10—backflow
11—sound emission
12—stator
13—blade
14—turbulence generator
15—circle
16—front edge
17—separation
18—substrate
19—loops
20—height
21—distance
22—width
23—hub
24—arrow

We claim:

1. An axial flow machine through which a fluid is drawn from a suction side and passed to a pressure side, the machine having an elongated casing formed about a longitudinal axis, a rotor rotatably supported within the casing along said axis, the rotor having a plurality of blades, the tips of the rotor blades extending radially away from the axis toward the casing, the blade tips being spaced from the inner surface of the casing thus forming a gap between the rotor blade tips and the inner surface of the casing, the gap extending continuously about the periphery of the inner surface of the casing so that the blade tips do not strike the inner surface, comprising:

turbulence generator means mounted continuously about the inner periphery of the casing in the gap formed between the blade tips and the inner surface of the casing in a density sufficient for decreasing sound emissions from the machine and for increasing fluid backflow resistance in the gap from the pressure side to the suction side of the machine;

said turbulence generator means extending radially into the gap from the inner surface of the casing toward the rotor blade tips and being sized and shaped to be yieldingly urged toward the rotor blade tips to at least partially close the gap.

2. A method of reducing the sound emission and backflow of an axial fan machine having a suction side and a pressure side, the machine having an elongated casing formed about a longitudinal axis, a rotor rotatably supported within the casing along said axis, the rotor having a plurality of blades, the tips of the rotor blades extending radially away from the axis toward the casing, the blade tips being spaced from the inner surface of the casing thus forming a gap between the rotor blade tips and the inner surface of the casing, the gap extending continuously about the periphery of the inner surface of the casing so that the blade tips do not strike the inner surface, comprising the steps of:

rotating the rotor of the axial fan machine;

drawing a fluid toward the axial fan machine on its suction side;

passing the fluid through the axial fan machine toward its pressure side;

passing the rotor blade tips a spaced distance from the inner surface of the casing so that the blade tips do not strike the inner surface;

positioning turbulence generator means continuously about the inner periphery of the casing in the gap formed between the blade tips and the inner surface of the casing in a density sufficient for decreasing sound emissions from the axial fan machine and for increasing fluid backflow resistance in the gap from the pressure side to the suction side of the machine; and extending said turbulence generator means radially into the gap from the inner surface of the casing toward the rotor blade tips and yieldingly urging said turbulence generator means toward the rotor blade tips to at least partially close the gap.

3. An axial flow machine through which a fluid is drawn from a suction side and passed to a pressure side, the machine having an elongated casing formed about a longitudinal axis, a rotor rotatably supported within the casing along said axis, the rotor having a plurality of blades, the tips of the rotor blades extending radially away from the axis toward the casing, the blade tips being spaced from the inner surface of the casing thus forming a gap between the rotor blade tips and the inner surface of the casing, the gap extending continuously about the periphery of the inner surface of the casing so that the blade tips do not strike the inner surface, comprising:

turbulence generator means mounted continuously about the inner periphery of the casing in the gap formed between the blade tips and the inner surface of the casing for decreasing sound emissions from the machine and for increasing fluid backflow resistance in the gap from the pressure side to the backflow side of the machine;

wherein said turbulence generator means extends radially into the gap from the inner surface of the casing toward the rotor blade tips and is sized and shaped to be yieldingly urged toward the rotor blade tips to at least partially close the gap.

4. The axial flow machine of claim 1, wherein said turbulence generator means comprises an adhesive tape substrate mounted to the inner surface of the casing, and a plurality of flexible loops spaced from one another and fastened to said substrate.

5. The axial flow machine of claim 4, wherein said loops are elastic.

6. The axial flow machine of claim 5, wherein said loops are comprised of a polyamide.

7. The axial flow machine of claim 1, wherein said turbulence generator means comprises wire cloth.

8. The axial flow machine of claim 1, wherein said turbulence generator means comprises textile cloth.

9. The axial flow machine of claim 1, wherein said turbulence generator means is mounted continuously along the inner periphery of the casing adjacent that point where the rotor blade tips extend their farthest toward the inner casing.

10. The method of claim 2, further comprising the steps of mounting said turbulence generator means continuously along the inner periphery of the casing adjacent that point where the rotor blade tips extend their farthest toward the inner casing.

11. The axial flow machine of claim 3, wherein said turbulence generator means is mounted continuously along the inner periphery of the casing adjacent that point where the rotor blade tips extend their farthest toward the inner casing.

* * * * *